United States Patent [19]

Boike

[11] Patent Number: 5,383,377
[45] Date of Patent: Jan. 24, 1995

[54] ROTATABLE ISOLATED END FITTING

[75] Inventor: Randy J. Boike, Clarkston, Mich.

[73] Assignee: Teleflex Incorporated, Limerick, Pa.

[21] Appl. No.: 112,574

[22] Filed: Aug. 25, 1993

[51] Int. Cl.[6] ............................................. F16C 1/10
[52] U.S. Cl. ............................... 74/502; 74/502.4; 74/502.6
[58] Field of Search ............... 74/500.5, 501.5 R, 502, 74/502.4, 502.6; 249/83

[56] References Cited

U.S. PATENT DOCUMENTS

| | | | |
|---|---|---|---|
| 2,884,771 | 5/1959 | Holt | 74/502 |
| 3,139,768 | 7/1964 | Biesecker | 74/501 |
| 3,221,572 | 12/1965 | Swick | 74/501 |
| 3,263,520 | 8/1966 | Tschanz | 74/501 |
| 3,366,405 | 1/1968 | Sevrence | 287/20 |
| 3,380,318 | 4/1968 | Henning | 74/501 |
| 3,572,160 | 3/1971 | Stahr | 74/501 |
| 3,631,738 | 1/1972 | Harper | 74/501 |
| 3,705,445 | 12/1972 | Smollinger | 24/123 |
| 3,716,650 | 2/1973 | de Mecquenem | 174/42 |
| 3,885,767 | 5/1975 | Olowinski et al. | 248/204 |
| 4,079,950 | 3/1978 | Langford | 74/502 |
| 4,131,379 | 12/1978 | Gordy et al. | 403/197 |
| 4,177,691 | 12/1979 | Fillmore | 74/501 |
| 4,348,348 | 9/1982 | Bennett et al. | 74/502 |
| 4,380,178 | 4/1983 | Bennett et al. | 74/502 |
| 4,406,177 | 9/1983 | Bennett et al. | 74/502 |
| 4,596,486 | 6/1986 | Niederer | 74/502.6 X |
| 4,621,937 | 11/1986 | Maccuaig | 403/197 |
| 4,664,423 | 5/1987 | Rowley | 74/502.6 X |
| 4,854,185 | 8/1989 | Lichtenburg et al. | 74/501.5 |
| 4,860,609 | 8/1989 | Spease | 74/502.6 X |
| 4,903,541 | 2/1990 | Shiota | 74/502.6 |
| 4,998,446 | 3/1991 | Towne et al. | 74/473 |
| 5,002,315 | 3/1991 | Bartholomew | 285/93 |
| 5,010,781 | 4/1991 | Kirk et al. | 74/502.4 |
| 5,039,138 | 8/1991 | Dickirson | 74/502.4 X |
| 5,199,320 | 4/1993 | Spease et al. | 74/502.6 X |

Primary Examiner—Vinh T. Luong
Attorney, Agent, or Firm—Reising, Ethington, Barnard, Perry & Milton

[57] ABSTRACT

A motion transmitting remote control assembly (10) of the type for transmitting motion along a curved path by a flexible motion transmitting core element (54) includes a conduit (12) and a cable (54) that is movably supported along its length within the conduit (12). A support member (48) attaches one end (14) of the conduit (12) to a support structure (46). An isolator (96) is disposed between the support member (48) and the conduit end (14). The conduit end (14) has an integral conduit end fitting (18). The isolator (96) dampens vibrations and shocks transmitted between the support member (48) and the conduit end (14). The isolator (96) is fixed against translational movement relative to the conduit end (14). An anti-stick coating (106) disposed on the outer surface (100) of the conduit end fitting (18) allows the conduit end (14) and conduit end fitting (18) to rotate relative to the support member (48).

23 Claims, 3 Drawing Sheets

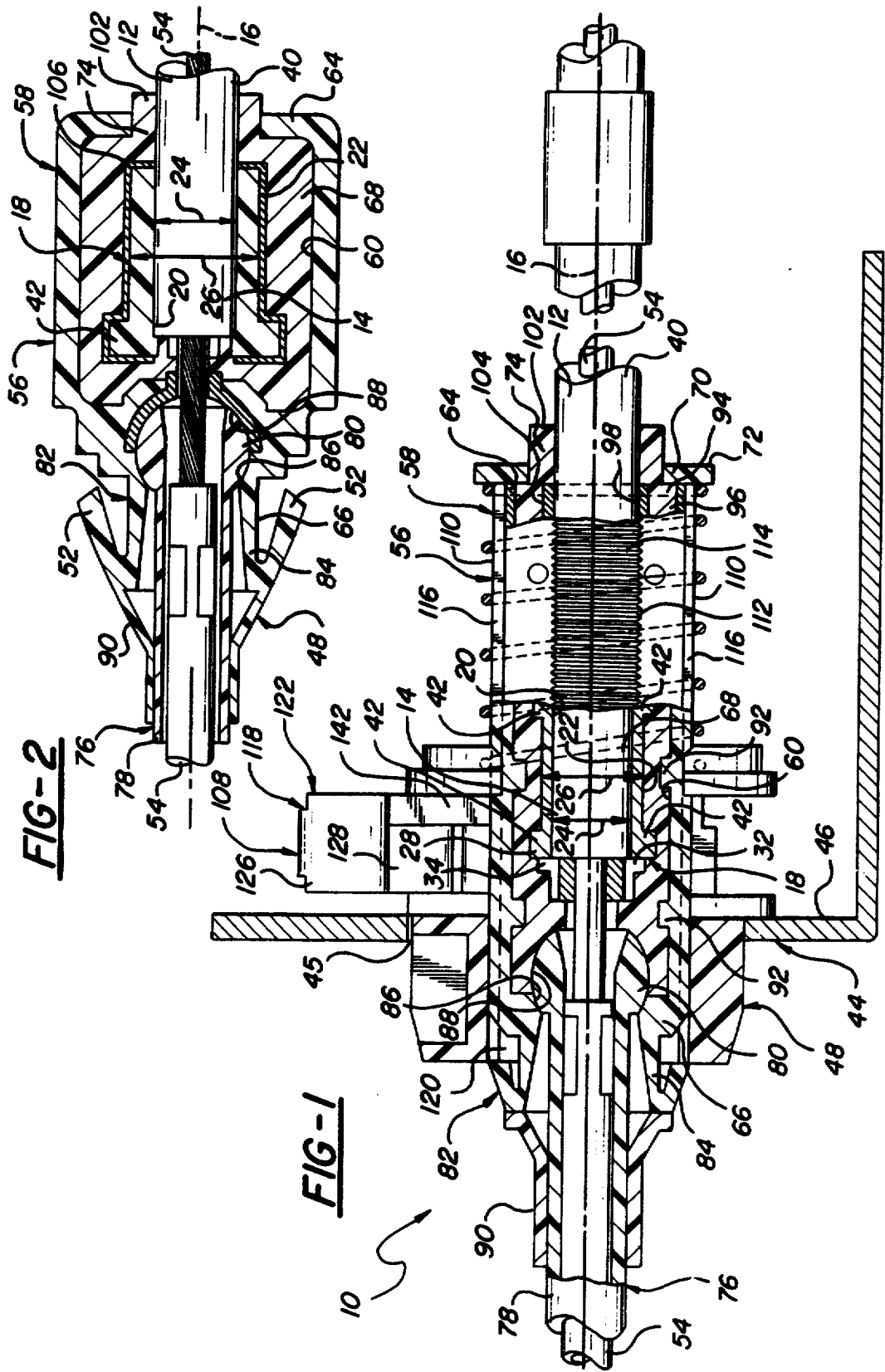

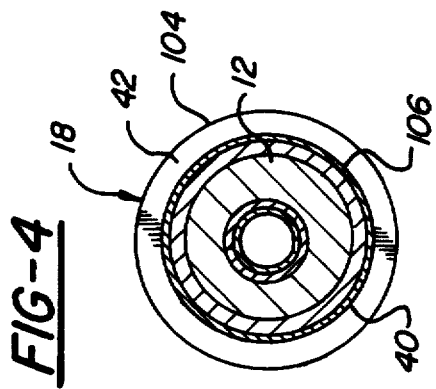
FIG-4
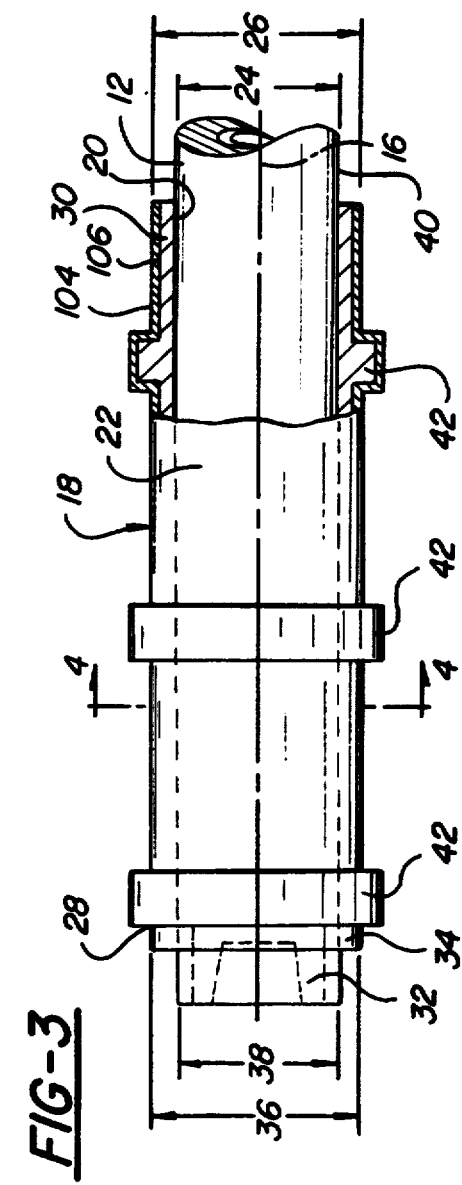
FIG-3
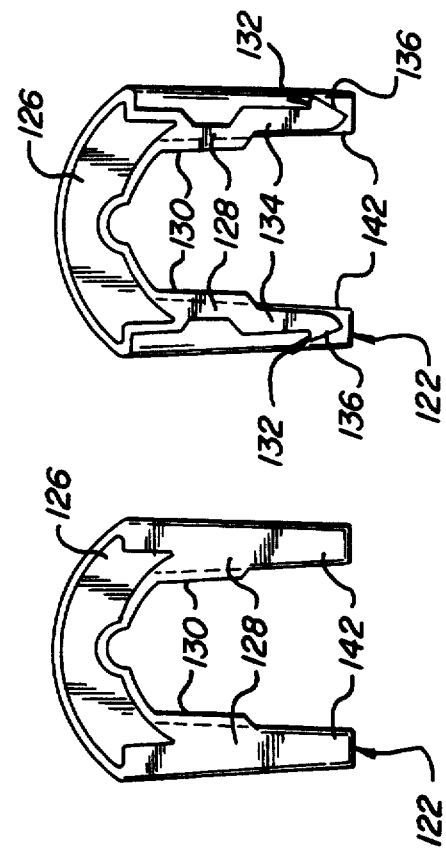
FIG-9
FIG-8
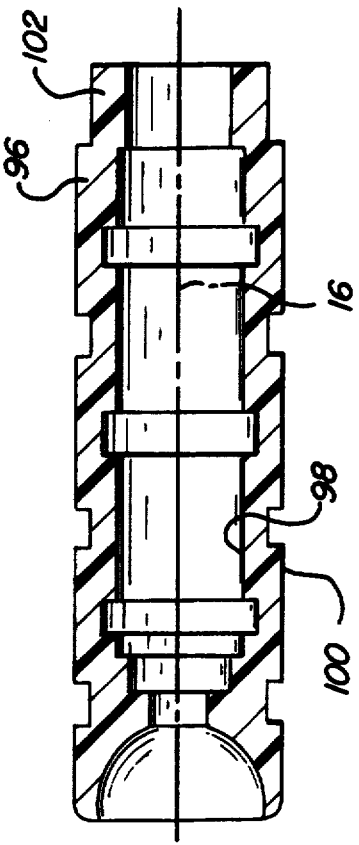
FIG-7

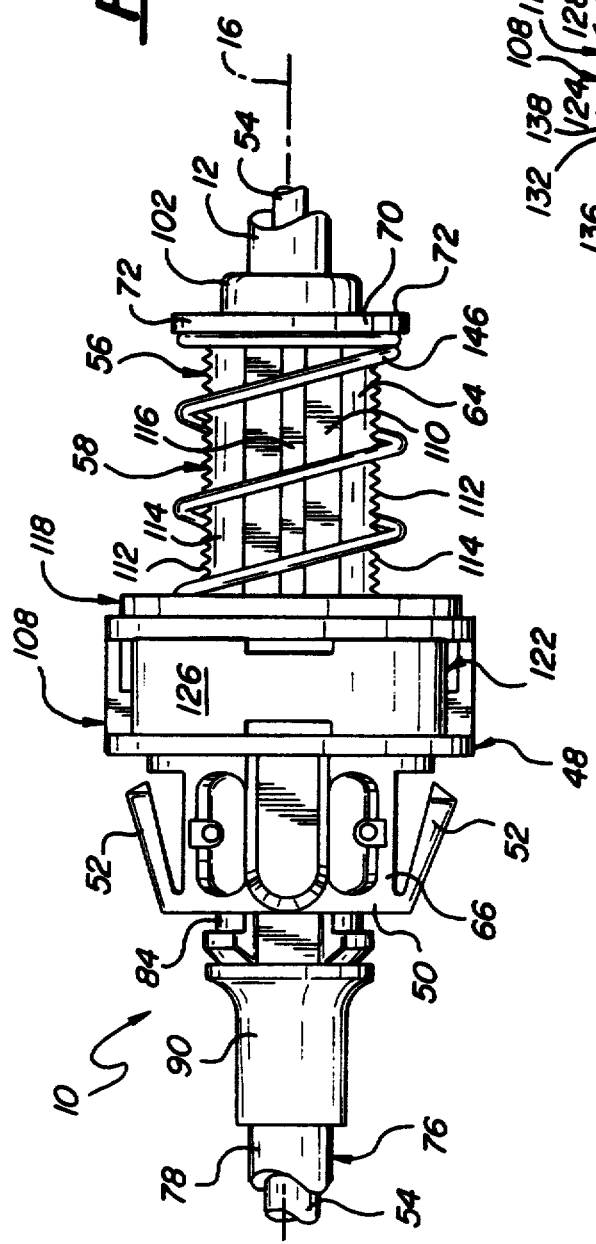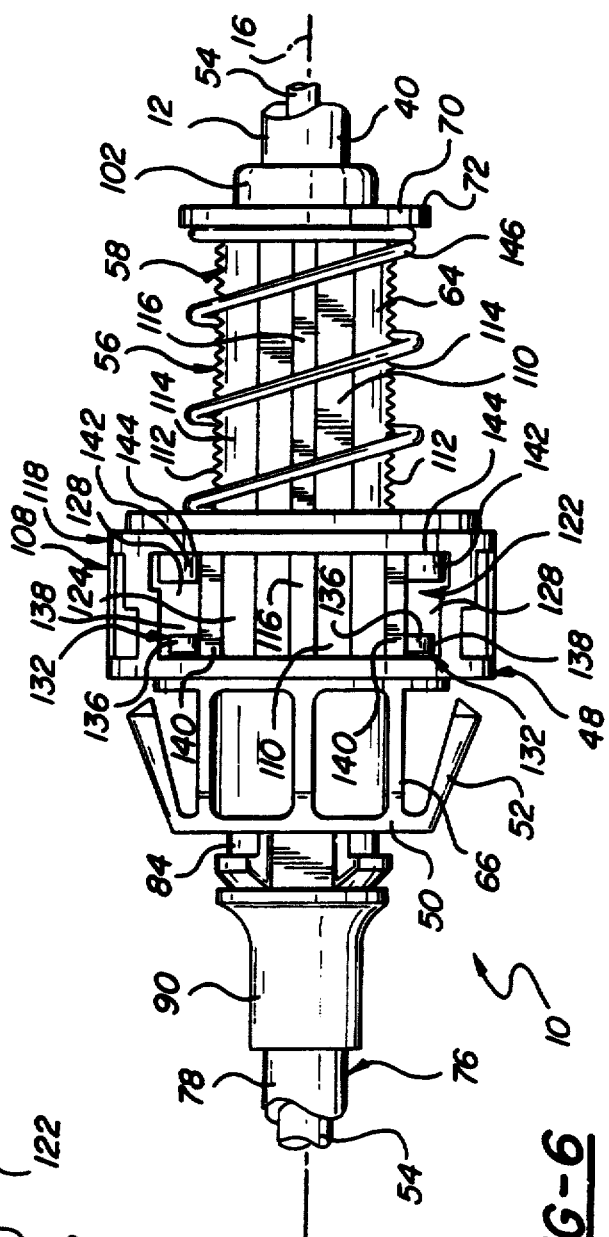

ROTATABLE ISOLATED END FITTING

TECHNICAL FIELD

The subject invention relates to a motion transmitting remote control assembly of the type for transmitting motion along a curved path by flexible motion transmitting core element movably supported by a flexible conduit.

BACKGROUND OF THE INVENTION

Motion transmitting remote control assemblies for transmitting motion in a curved path are used in aircraft, automotive, and marine environments. A typical use of such remote control assemblies is the positioning of throttle and transmission shift members in automobiles. In general these assemblies include a flexible tubular conduit movably supporting a flexible motion transmitting core element with two ends.

Such assemblies normally include one or more fittings secured to the conduit for attaching the conduit to a support structure of the automobile. The core element is adapted at one end to be attached to a member to be controlled whereas the other end is attached to a manual actuator for longitudinally moving the core element.

An example of prior art end fitting assemblies is shown in U.S. Pat. No. 4,386,755 to Bennett issued Jun. 7, 1983. The Bennet '755 patent discloses a mold assembly and method for making a motion transmitting remote control assembly. The assembly includes a core element, a conduit, and a support member for fixedly attaching the assembly to a support structure. The assembly also includes an isolation member for dampening vibrations transmitted between its conduit end and its support means. The assembly disclosed in the Bennet '755 method patent does not, however, allow its conduit end to rotate within its isolation means.

In motion-transmitting remote control assemblies, it is frequently desirable to adjust the length or position of the end of the conduit once the assembly has been installed. After the assembly has been installed, the position of the actuator must be adjusted to correspond with the position of the member to be controlled so that both the actuator and member to be controlled reach their terminal end stroke positions at exactly the same time, and so that there is no slack, or play, between them. This is accomplished by either adjusting the length of the core element or the length of the conduit, as is well known in the art.

One example of prior art end fittings with conduit-adjustment assemblies is shown in U.S. Pat. No. 5,161,428 to Petrucello issued Nov. 10, 1992. The assembly includes a core element, a conduit, and a support member for fixedly attaching the assembly to a support structure. This reference also discloses adjustment means attached to a conduit for adjusting the effective length of the conduit. In addition, the Petrucello '428 patent includes rotation means for rotatably supporting the conduit's end relative to the adjustment means. It does not, however, include isolation means for dampening shocks and vibrations while allowing the conduit to rotate in relation to the adjustment means.

Another example of prior art end fittings with conduit-adjustment assemblies is a Teleflex Incorporated product. The assembly includes a core element, a conduit, and a support member for fixedly attaching the assembly to a support structure. An adjustment means is attached to a conduit for adjusting the effective length of the conduit. Also included in this assembly is an isolation member for dampening vibrations transmitted between its conduit end and its support member. The assembly does not, however, allow its conduit end to rotate within its isolation means.

SUMMARY OF THE INVENTION AND ADVANTAGES

The invention is a motion transmitting remote control assembly of the type for transmitting motion along a curved path by a flexible motion transmitting core element. The assembly includes a conduit and a flexible motion transmitting core element having a length and a central axis and movably supported along its length within the conduit. The assembly also includes support member for attaching one end of the conduit to a support structure. Isolation means are disposed between the support member and the conduit end for dampening vibrations and shocks transmitted between the support member and the conduit end. The isolation means is fixed against translational movement relative to the conduit end. Characterizing the invention is a circumferential anti-stick surface contiguous with the isolation means. The circumferential anti-stick surface allows the conduit end to rotate relative to the support structure.

Accordingly, this invention's circumferential anti-stick surface permits an operator to install the assembly free of pent-up twisting forces. After installation, the circumferential anti-stick surface allows the isolation means to dampen shocks and vibrations transmitted between the conduit and the support structure while permitting the conduit to rotate relative to the isolation means. The isolation means with the circumferential anti-stick surface is durable, s imply designed, and easy to manufacture since its manufacturing process requires little or no re-tooling from that used in previous designs. The rotatable feature of the invention allows for ease of installation and relief of torsional forces and resulting conduit wear in applications that would otherwise result in pent-up torsional forces in the conduit. The isolation feature of the invention dampens shocks and vibrations in the assembly reducing conduit wear at rigid support points. The isolation feature also reduces the transmission of shocks and vibration through the support member and support structure and into adjacent structures, and vice versa. The advantages of this invention will be realized whether the circumferential anti-stick surface is disposed contiguous with isolation means at the adjustment end or at the opposite, fixed end of an adjustable conduit. The same advantages will also be realized if the circumferential anti-stick surface is disposed contiguous with isolation means at either end of a non-adjustable conduit.

BRIEF DESCRIPTION OF THE DRAWINGS

To better appreciate the advantages of this invention, refer to the following detailed description in connection with the accompanying drawings:

FIGURE 1 is a partial-cutaway cross-sectional side view of the preferred embodiment attached to a supporting member;

FIG. 2 is a cross-sectional side view of an alternative embodiment of the invention with no adjustment means;

FIG. 3 is a partial-cutaway cross-sectional side view of the conduit end fitting of the preferred embodiment;

FIG. 4 is a cross-sectional view of the conduit end fitting taken along line 4—4 of FIG. 3.

FIG. 5 is a top view of the preferred embodiment of the invention;

FIG. 6 is a bottom view of the preferred embodiment of the invention;

FIG. 7 is a cross-sectional side view of the isolator of the preferred embodiment;

FIG. 8 is a front view of the preferred embodiment's locking member; and

FIG. 9 is a back view of the preferred embodiment's locking member.

DETAILED DESCRIPTION OF THE PREFERRED EMBODIMENT

Referring now to FIG. 1, the preferred embodiment of a motion transmitting remote control assembly constructed in accordance with this invention is generally shown at 10. The assembly 10 is of the type for transmitting motion along a curved path by a flexible motion transmitting core element.

The assembly 10 includes a conduit 12 having an end 14, a length and a central axis 16. The conduit 12 is preferably of the known type used in remote control assemblies including an inner tubular member over an organic polymeric material surrounded by a plurality of filaments or long lay wires disposed on a long lead and encased in an outer jacket of organic polymeric material. The organic polymeric material may be of the various known plastics such as polyethylene etc.

The conduit end 14 has an integral conduit end fitting, generally indicated at 18 in FIGS. 1, 2 and 3. The end fitting 18 is generally tubular in shape having an inner surface 20 and an outer surface 22 and constant inner and outer diameters, 24 and 26 respectively. In the preferred embodiment, the end fitting 18 has a length approximately four times greater than its outer diameter 26. The end fitting 18, in the preferred embodiment, has a capped end 28 and an open end 30. The conduit 12 terminates at the capped end 28 and protrudes from the open end 30 of the end fitting 18. The capped end 28 has an integral annular flanged cap 32. The flanged cap 32 is generally ring-shaped and has a radially-outwardly flanged base 34. The flanged base 34 has an outer diameter 36 approximately equal to the outer diameter of the end fitting 18. The flanged base 34 has an inner diameter approximately one-third that of the inner diameter 24 of the end fitting 18. The flanged cap 32 has an axial length approximately one half the outer diameter 36 of its base 34. The inner diameter of the flanged cap 32 is constant along the approximate first 25% of its axial length from its base 34, and increases approximately 10% along the remainder of its axial length. The flanged cap 32 has an outer diameter 38 that is constant along its axial length, and is smaller than the outer diameter 36 of its flanged portion. The end fitting 18 and flanged cap 32 are both preferably made of an organic polymeric material. The conduit 12 has an exterior surface 40 and the conduit end fitting 18 is bonded to that exterior surface 40 along the inner surface 20 of the end fitting 18. The conduit end 14 is disposed within the end fitting 18 adjacent the base 34 of the flanged cap 32.

The outer surface 22 of the conduit end fitting 18 may have annular exterior flanges 42 integrally formed at evenly-spaced points along that outer surface 22. The exterior flanges 42 are square-edged bands that extend circumferentially around the outer surface 22 of the conduit end fitting 18. The annular exterior flanges 42 extend to a height above the outer surface 22 of the end fitting 18 equal to approximately one-eighth the outer diameter 26 of the end fitting 18. The width of the annular exterior flanges 42 is approximately twice their height. In the preferred embodiment the end fitting 18 has three annular exterior flanges 42.

A support member, generally indicated at 48 in FIG. 1, attaches the conduit end 14 to a support structure 46. The support member 48 may be one of many styles commonly known in the art. In the preferred embodiment, the support member 48 is adapted to attach to a support structure 46 such as a bracket or bulkhead, best shown in FIG. 1. The support member 48 includes a snap-in means 50 for insertion through an opening 45 in the support structure 46 to retain the support member 48. The snap-in means 50 preferably comprises two biasing arms 52 which, in installation, are forced through the opening 45 in the support structure 46 and are compressed so that they fit through the opening 45. Once through the opening 45, the biasing arms 52 bias outwardly and retain the support member 48 against the support structure 46. The biasing arms 52 are preferably made of an organic polymeric material.

The assembly 10 includes a flexible motion transmitting core element 54 having a length and a central axis 16 and movably supported along its length within the conduit 12. The axes of the conduit 12 and core element 54 are generally coincidental, and for all practical purposes, are the same axis. The core element 54 is a wire member, as illustrated, but also may comprise metal strands helically wound together in cable-like fashion. Normally, coupling members (not shown) are secured to the ends of the core element 54 for attachment of the core element 54 to operated or operating members (not shown).

An isolation means, generally indicated at 56 in FIGS. 1, 2, 5 and 6, is disposed between the support member 48 and the conduit end 14 for dampening vibrations and shocks transmitted between the support member 48 and the conduit end 14. The isolation means 56 is fixed against translational movement relative to the conduit end 14.

The isolation means 56 includes a generally cylindrical housing, generally indicated at 58 in FIGS. 1, 2, 5 and 6. The cylindrical housing 58 has a longitudinal axis 16 coincident with the longitudinal axis 16 of the conduit 12 and core element 54, an inner surface 60, an outer circumference 62, and a first 64 and second 66 end. The cylindrical housing 58 also has a cylindrical receptacle 68 disposed within, concentric with the longitudinal axis 16. The inner surface 60 of the cylindrical housing 58 defines the cylindrical receptacle 68.

The cylindrical housing 58, in the preferred embodiment, has a flat, annular cap 70 covering the first end 64 of the cylindrical housing 58. The annular cap 70 has a diameter slightly larger than that of the cylindrical housing 58 and is fixed to, or is integral with, the first end 64 of the cylindrical housing 58. The portion of the annular cap 70 extending radially beyond the circumference of the cylindrical housing 58 forms a collar 72. The annular cap 7 has a hole 74, concentric with the cylindrical housing 58. The hole 74 in the annular cap 70 has a diameter slightly larger than the outer diameter of the conduit 12. The conduit end fitting 18 and conduit end 14 are disposed within the cylindrical receptacle 68 with the conduit 12 protruding from the cylindrical housing 58 through the hole 74 in the annular cap 70.

Swivel means, generally indicated at 76 in FIGS. 1, 2, 5 and 6, may be positioned adjacent the second end 66 of the cylindrical housing 58 for supporting the core element 54 at acute angles from its longitudinal axis b6. The swivel means 76 includes a swivel tube 78 having a spherical end 80 allowing it to pivot at various acute angles. The swivel means 76 also includes a swivel retainer generally indicated at 82 in FIGS. 1 and 2. The swivel retainer 82 includes a conical socket 84, a rim 86, and a spherical socket 88. The conical socket 84 and rim 86 are integrally formed at the second end 66 of the cylindrical housing 58 and are concentrically disposed about the longitudinal axis 16. The rim 86 has a diameter smaller than the diameter of the spherical end 80 of the swivel tube 78 for retaining the spherical end 80 of the swivel tube 78. In other words, the smaller diameter of the rim 86 prevents the spherical end 80 of the swivel tube 78 from passing through. The conical socket 84 limits the pivotal movement of the swivel tube 78. A sleeve-like umbrella 90 may be secured over the swivel tube 78 and the conical socket 84 for precluding the intrusion of foreign matter. The spherical end 80 of the swivel tube 78 is slidably retained within the rim 86 and the spherical socket 88. The core element 54 passes from the conduit end fitting 18 be through the swivel retainer 82, and exits out the swivel tube 78.

The preferred embodiment also has a plurality of annular interior flanges, as shown at 92 in FIG. 1, integrally circumferentially formed around the inner surface 60 of the cylindrical housing 58. The interior flanges 92 have squared edges and alternate with the exterior flanges 42 in a staggered disposition along the longitudinal axis 16 of the cylindrical receptacle 68. The inner surface 60 of the cylindrical housing 58 is spaced radially from the outer surface 22 of the end fitting 18 to form an interstitial volume 94. The cylindrical housing 58, annular cap 70, annular interior flanges 92 and swivel tube 78 are preferably made of an organic polymeric material.

The isolation means 56 includes an isolator 96, best shown in FIGS. 1 and 7, with an inner surface 98 and an outer surface 100. The isolator 96 is disposed within the cylindrical receptacle 68 and substantially fills the interstitial volume 94 as shown in FIG. 1. In other words, the shape of he isolator 96 is defined by the cylindrical receptacle 68, the interior flanges 92, the inner end fitting 18, the exterior flanges 42, the conduit 12 and the spherical end 80 of the swivel tube 78. The resulting shape of the isolator 96 is best shown in FIG. 7. By conforming to the shape of the exterior 42 and interior flanges 92, the isolator 96 cooperates with those flanges 42, 92 to prevent axial translatory motion of the conduit 12 relative to the isolation means 56. By conforming to the shape of the spherical end 80 of the swivel tube 78, the isolator 96 forms the spherical socket 88. The isolator 96 also extends beyond the interstitial volume 94 through the space between the conduit 12 and the hole 74 in the annular cap 70. The isolator 96 extends out from the housing 58 an axial distance approximately equal to one quarter the outer diameter of the housing 58 forming an extension 102. The outer diameter of the isolator extension 102 is approximately equal to the diameter of the hole 74 in the annular cap 70. The outer surface 100 of the isolator 96 is normally fixed in relation to the inner surface 60 of the cylindrical housing 58. The isolator 96 is made of an elastomeric polymeric material.

The invention is characterized by a circumferential anti-stick surface 104 contiguous with the isolation means 56 and allowing the conduit end 14 to rotate relative to the support member 48 and support structure 46. The anti-stick surface 104 comprises an anti-stick coating 106 contiguous with the isolator 96 and is normally bonded to the outer surface 22 of the conduit end fitting 18 as shown in FIG. 3. The anti-stick coating 106 is preferably made of a substance such as polytetrafluoroethylene, that bears the Du Pont Teflon certification mark. The anti-stick coating 106 reduces the friction between the outer surface 22 of the conduit end fitting 18 and the inner surface 98 of the isolator 96 allowing relative rotational movement between the conduit 12 and the support member 48. In other words, in the preferred embodiment, the rotational sliding movement normally occurs between the inner surface 98 of the isolator 96 and the outer surface 22 of the end fitting 18.

The preferred embodiment of the invention includes an adjustment means, generally indicated at 108 in FIGS. 1, 5 and 6, moveable between engaged and disengaged positions for allowing relative movement between the isolation means 56 and the support member 48 along the longitudinal axis 16 when in the disengaged position and for preventing the relative movement when in the engaged position.

The cylindrical housing 58 has two sets of flat opposing surfaces 110, 112 extending from its first to its second end 66. The surfaces are evenly spaced around the outer circumference 62 of the housing 58 with surfaces 110 at the 12 o'clock and 6 o'clock positions, and surfaces 112 at the 3 o'clock and 9 o'clock positions, respectively. The surfaces 112 at 3 and 9 o'clock have a plurality of evenly-spaced, vertical adjustment teeth 114 disposed perpendicular to the longitudinal axis 16. The surfaces 110 at 12 and 6 o'clock each have a single rectangular rib 116 centered along their lengths that is disposed parallel to the longitudinal axis 16.

The support member 48 includes a slider body, generally indicated at e in FIGS. 1, 5 and 6, slidably disposed about the cylindrical housing 58. The slider body 8 has a generally annular shape with a passageway 120 conforming to the cross-sectional shape of the cylindrical housing 58. The passageway 120 includes rectangular grooves (not shown) at the 12 and 6 o'clock positions for slidably engaging the rectangular ribs 116. The slider body 118 also includes the above-described biasing arms 52 for fixing the slider body 118 and support member 48 to a support structure 46.

The support member 48 has a locking member, generally indicated at 122 in FIGS. 1, 5, 6, 8 and 9, moveable with the slider body 118 and selectively engageable with the adjustment teeth 114. The slider body 118 includes a transverse pathway 124 extending through the slider body 118 in a direction transverse to and intersecting the passageway 120. The locking member 122 is disposed in the transverse pathway 124 and is moveable between the engaged and disengaged positions.

As shown in FIGS. 8 and 9 the locking member 122 has a head 126 and facing flanks 128. A plurality of locking teeth 130 are arranged vertically along the flanks 128 and project inwardly. The locking teeth 130 are disposed in a direction transverse to the longitudinal axis 16 for engaging the adjustment teeth 114 on the housing 58 when the locking member 122 is in the engaged position.

The slider body 118 includes a force-fit self-locking retainer generally indicated at 132 in FIG. 9. A flexible finger 134 extends downward from each of the flanks 128. Each of the flexible fingers 134 includes a laterally extending projection 136. The support member 48 includes two finger channels 138 positioned along the transverse pathway 124 for slidably receiving the flexible fingers 134. Positioned along the finger channels 138 are ledges 140 for receiving the projections 136 and retaining the locking means in the engaged position.

The locking member 122 includes two flanges 142. Each flange 142 extends downwardly from each flank 128. The support member 48 includes two flange channels 144 extending along the transverse pathway 124 for slidably receiving the flanges 142 and thus guiding the movement of the locking member 122 along the transverse pathway 124 between the disengaged and engaged positions.

A biasing means 146, preferably a spring, is disposed between the collar 72 and the slider body 118 for urging the isolation means 56 to move relative to the slider body 118 and support member 48. Thus, when the locking member 122 is in the disengaged position, the biasing means 146 urges the collar 72 on the cylindrical housing 58 against the slider body 118 and support member 48. The collar 72 serves to both engage the biasing means 146 and to limit the relative movement of the slider body 118 toward the first end 64 of the cylindrical housing 58. The conical socket 84 at the second end 66 of the cylindrical housing 58 includes an end fitting 18 for limiting the movement of the slider body 118 toward the second end 66 of the cylindrical housing 58. The slider body 118 and locking member 122 are preferably made of an organic polymeric material.

This is an illustrative description of the invention using words of description rather than of limitation.

Obviously, many modifications and variations of this invention are possible in light of the above teachings. Within the scope of the claims, where reference numerals are merely for convenience and are not limiting, one may practice the invention other than as this specification describes.

I claim:

1. A motion transmitting remote control assembly (10) of the type for transmitting motion along a curved path, said assembly (10) comprising:
    a conduit (12) having an end (14);
    a flexible motion transmitting core element (54) having a length and a central axis (16) and movably supported along said length within said conduit (12);
    support member (48) rotatably disposed about said conduit (12) for attaching said conduit end (14) to a support structure (46);
    isolation means (56) disposed between said support member (48) and said conduit end (14) for dampening vibrations and shocks transmitted between the support structure (46) and said conduit end (14) and fixed against translational movement relative to said conduit end (14);
    characterized by a circumferential anti-stick surface (104) contiguous with said isolation means (56) and allowing said conduit end (14) to rotate relative to the support structure (46).

2. A motion transmitting remote control assembly (10) as set forth in claim 1 where said isolation means (56) includes an isolator (96) surrounding said conduit end (14).

3. A motion transmitting remote control assembly (10) as set forth in claim 2 further characterized by said isolator (96) comprising an elastomeric polymeric material.

4. A motion transmitting remote control assembly (10) as set forth in claim 2 further characterized by said conduit end (14) having an integral conduit end fitting (18).

5. A motion transmitting remote control assembly (10) as set forth in claim 4 where said conduit has an exterior surface (40), further characterized by said conduit end fitting (18) bonded to said exterior surface (40) of said conduit (12).

6. A motion transmitting remote control assembly (10) as set forth in claim 4 where said conduit end fitting (18) has an outer surface (22), further characterized by said conduit end fitting (18) having an annular exterior flange (42) integrally formed and extending circumferentially around said outer surface (22) of said conduit end fitting (18).

7. A motion transmitting remote control assembly (10) as set forth in claim 6 further characterized by said anti-stick surface (104) comprising an anti-stick coating (106) bonded to said outer surface (22) of said conduit end fitting (18).

8. A motion transmitting remote control assembly (10) as set forth in claim 6 further characterized by said annular exterior flange (42) having squared edges.

9. A motion transmitting remote control assembly (10) as set forth in claim 6 further characterized by said conduit end fitting (18) having a plurality of annular exterior flanges (42) spaced axially therealong.

10. A motion transmitting remote control assembly (10) as set forth in claim 9 further characterized by said isolation means (56) including a housing (58), said housing (58) having a longitudinal axis (16) and a cylindrical receptacle (68) disposed concentric with said longitudinal axis (16) for receiving said end fitting (18).

11. A motion transmitting remote control assembly (10) as set forth in claim 10 further characterized by said cylindrical receptacle (68) having an inner surface (60) and an annular interior flange (92) integrally circumferentially formed around said inner surface (60).

12. A motion transmitting remote control assembly (10) as set forth in claim 11 further characterized by said interior flange (92) having squared edges.

13. A motion transmitting remote control assembly (10) as set forth in claim 11 further characterized by said cylindrical receptacle (68) having a plurality of interior flanges (92).

14. A motion transmitting remote control assembly (10) as set forth in claim 13 further characterized by said interior flanges (92) alternating with said exterior flanges (42) in a staggered disposition along said longitudinal axis (16).

15. A motion transmitting remote control assembly (10) as set forth in claim 14 further characterized by said inner surface (60) of said receptacle (68) being spaced radially from said outer surface (22) of said end fitting (18) to form an interstitial volume (94).

16. A motion transmitting remote control assembly (10) as set forth in claim 15 further characterized by said isolator (96) disposed within said cylindrical receptacle (68) and substantially filling said interstitial volume (94).

17. A motion transmitting remote control assembly (10) as set forth in claim 10 further characterized by adjustment means (108) moveable between engaged and disengaged positions for allowing relative movement between said isolation means (56) and said support member (48) along said longitudinal axis (16) when in said disengaged position and for preventing said relative movement when in said engaged position.

18. A motion transmitting remote control assembly (10) as set forth in claim 17 where said housing has two opposite sides (112) and further characterized by said housing (58) having a plurality of evenly-spaced teeth (114) oriented vertically on each of said opposite sides (112).

19. A motion transmitting remote control assembly (10) as set forth in claim 18 further characterized by said support member (48) including a slider body (118) slidably disposed about said housing (58).

20. A motion transmitting remote control assembly (10) as set forth in claim 19 further characterized by a locking member (122) moveable with said slider body (118) and selectively engageable with said adjustment teeth (114).

21. A motion transmitting remote control assembly (10) as set forth in claim 19 further characterized by said slider body (118) including a force-fit self-locking retainer (132).

22. A motion transmitting remote control assembly (10) as set forth in claim 10 further characterized by a swivel tube (78) extending from said housing (58).

23. A motion transmitting remote control assembly (10) as set forth in claim 2 further characterized by said anti-stick surface (104) comprising an anti-stick coating (106) contiguous with said isolator (96).

* * * * *